UNITED STATES PATENT OFFICE.

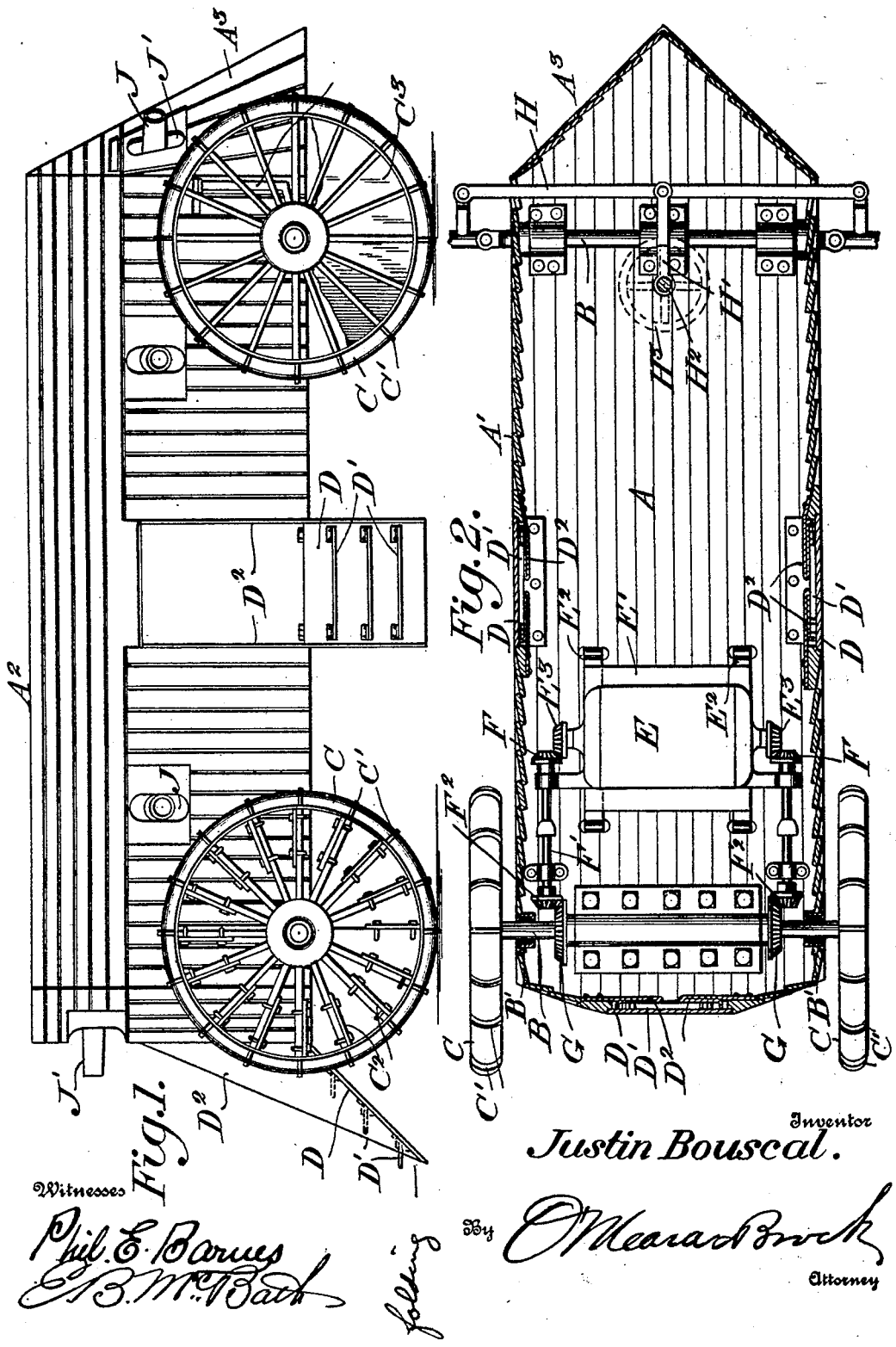

JUSTIN BOUSCAL, OF SAN FRANCISCO, CALIFORNIA.

WAR-MACHINE.

936,296. Specification of Letters Patent. Patented Oct. 12, 19(

Application filed February 15, 1907. Serial No. 357,533.

*To all whom it may concern:*

Be it known that I, JUSTIN BOUSCAL, a citizen of the Republic of France, residing at San Francisco, in the county of San Francisco, State of California, have invented a new and useful Improvement in War-Machines, of which the following is a specification.

This invention relates to a class of war machines known as armored automobiles.

The object of the invention is a power driven armor clad vehicle adapted for land use and also for crossing streams, the body of the vehicle being water tight and capable of floating, and the rear wheels being provided with paddles for the purpose of propelling the vehicle through the water.

The invention consists of the novel features of construction hereinafter fully described, pointed out in the claims and shown in the accompanying drawings, in which, Figure 1 is a side elevation of the machine. Fig. 2 is a plan view of the bottom of the machine showing the location of the motor and the gearing, the sides and doors being in section.

In these drawings A represents the body of the vehicle which is of iron or steel the sides A' being formed of vertically arranged over-lapping plates and the entire construction being covered by a metal hip roof $A^2$, and the front of the machine is provided with a semi-conical end portion $A^3$. This body portion is mounted upon the axles B which are arranged above the bottom of the vehicle body instead of beneath it, and which pass loosely through the sides A'. Any suitable packing B' may be employed around the axles at points of passage through the sides in order to prevent water from entering the vehicle when crossing a stream. Upon these axles are mounted wheels C which may be of any desired construction and the tires of which are provided with suitable projections or teeth C' to enable the machine to readily climb steep grades and the rear wheels have paddles $C^2$ secured to their spokes to aid in propelling the machine through the water. The front wheel is webbed as shown at $C^3$ and forms rudders for steering the device when floating. Trap doors D are provided at the sides and rear and are provided with hinged steps D' which drop into operative position when the doors are lowered and fold upon the doors when they are closed. The doors are lifted into place by means of flexi belts $D^2$ which also form sides for the st when the doors are lowered.

A suitable motor E of any form is mou ed upon a platform E' which is suppor upon springs $E^2$. This motor is arran; within the vehicle body and the motor sh is provided at its ends with bevel gears These gears mesh with bevel gears F c ried upon ends of shafts F' which are ¿ provided with beveled gears $F^2$ which turn mesh with bevel gears G fixed upon rear axle B.

The front axle is formed in sections usual and is provided with a steering ba1 which is operated by means of a lever one end of which is fixed to a vertical st ing rod $H^2$ provided with a steer wheel $H^3$.

The sides and ends are provided w suitable port holes J from which macl guns J' may be projected.

Having thus fully described my invent what I claim as new and desire to secure Letters Patent, is:—

1. An armored automobile of the kind scribed, front and rear axles journaled in sides of said automobile and above the i tom, said bottom and sides being w; tight, suitable packing around said axle points of passage through the sides, me for steering the front wheels, means driving the rear wheels, webs formed on front wheels, a paddle carried by the 1 wheels, as and for the purpose set forth 2. An armored automobile comprisin water tight body, wheels supporting : body, means arranged within the body driving the rear wheels, means arrar within said body for steering the f: wheels, trap doors forming a portion of body when elevated and forming steps w lowered and flexible belts connected to said doors and to the vehicle body, said 1 providing means for lifting the doors, also providing sides for the steps when doors are lowered.

3. An armored automobile of the kind scribed comprising a water tight b packed axles passing through the side the body, wheels on the axles, paddle: portion of said wheels, webs forming ders on a portion of said wheels, means steering the webbed wheels, a motor ranged within the body, and gearing ranged within the vehicle body for t1 mitting rotation of the motor to one of said axles.

4. A device of the kind described consisting of an armored body provided with front and side gun ports, front and rear axles, wheels upon said axles, the front wheels forming steering wheels and being webbed, means for driving said wheels, hinged doors, means for swinging said do outwardly and downwardly, and steps ried by the doors.

JUSTIN BOUSCAI

Witnesses:
H. L. H. VALENTINE,
EDMOND LEVILLAIN.

*Carriages & Wagons, Stys*
*Owen, 255,327, Mar. 21, 1882*

*115-1*
*Br. X Ravaillier, 25,221 of 1906*
*Such, 780,835,*
*Olsen, 464,227.*